(No Model.)

G. C. BARTLETT.
POTATO DIGGER.

No. 366,553. Patented July 12, 1887.

Witnesses:
Edward Smith,
Jonas Pusey

Inventor:
George C. Bartlett
By Joseph Smith.
His attorney in fact.

United States Patent Office.

GEORGE C. BARTLETT, OF OIL CREEK, ASSIGNOR OF TWO-THIRDS TO BURTON F. EDWARDS AND WILLIAM H. EDWARDS, BOTH OF TITUSVILLE, PENNSYLVANIA.

POTATO-DIGGER.

SPECIFICATION forming part of Letters Patent No. 366,553, dated July 12, 1887.

Application filed December 22, 1886. Serial No. 222,338. (No model.)

*To all whom it may concern:*

Be it known that I, GEORGE C. BARTLETT, a citizen of the United States, residing at Oil Creek borough, in the county of Crawford and State of Pennsylvania, have invented a new and useful Improvement in Potato-Diggers, of which the following is a specification.

My invention relates to those machines consisting of a plow followed by a revolving fork for separating the potatoes from the earth, my object being to construct one simple and effective in all its parts, and which shall keep its own mechanism free from clods of earth, stones, sods, &c. This I attain by the device illustrated in the accompanying drawings, in which—

Figure 1:
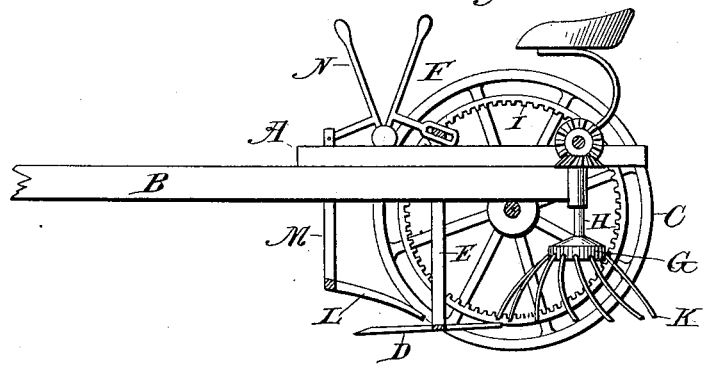
Figure 2:
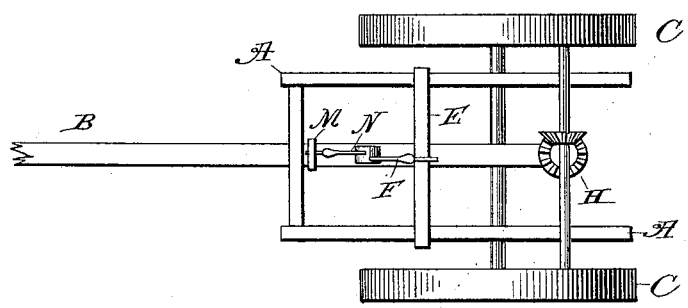

Figure 1 shows a sectional side elevation, one wheel and one side being removed to more clearly show the mechanism; Fig. 2, a plan or top view; and Fig. 3, a top view of the cutter-blade, colter, and revolving fork.

In the several figures the same letters are used to indicate the same parts.

A is the frame of the machine; B, the draft pole or tongue; C C, the wheels; D, the cutter-blade, consisting of a thin flat blade of steel, adapted to run under the potato plants and under the tubers, to release them from the underlying earth. This is a flat blade, very slightly inclined upward, so that it cuts under the rows rather than raises them up and breaks them. This cutter-blade is supported by a bar, E, the two ends of which are attached to the opposite sides of the cutter-blade and the loop passing up on either side and over the top of the frame A and through the arm of the adjusting-lever F, as shown in Fig. 1, whereby the cutter-blade may be raised or lowered at the will of the operator.

Directly in rear of the cutter-blade is the revolving fork G, attached to and adjusted on the spindle or shaft H, which is attached to the frame A and is driven by connecting shafts and gear with the circular rack I on each of the wheels, the manner of making the connections being those in common use on agricultural machines, and need not be more fully described here.

Figure 3:
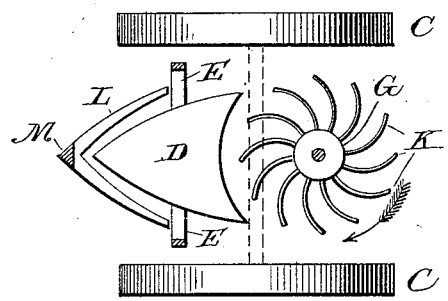

The fork G is made pendent to the lower end of the shaft H, and with its prongs K arranged collectively in the form of a cone or segment of a sphere, and with the lower end of each prong curved backward from the direction in which the fork revolves, as shown more distinctly in Fig. 3, where the direction of the revolution is indicated by the arrow. The fork is placed directly in rear of the cutter-blade D, which is preferably formed so as to correspond in shape to the fork, and with the points of the prongs very nearly level with the cutter-blade. The fork G is not shown here as vertically adjustable, but may be made so by any of the devices in common use.

Directly preceding the cutter-blade D is the colter L, consisting of a thin blade of metal, shaped as shown in Fig. 3, and with the ends drooping, as shown in Fig. 1, so that the colter may fit over the ridge made along the rows. This is for the purpose of clearing away the vines, weeds, &c., previous to the passage of the cutter-blade and fork. This colter is supported by the bar M, which passes up through the frame A, and is connected to the arm of the adjusting-lever N, which places the colter entirely within the control of the operator.

The operation of the machine is now obvious. The team being attached and the machine drawn "straddle" of the row, the operator adjusts the cutter-blade so that it shall cut under the tubers, releasing the earth and severing the roots, leaving the earth in the ridge and around the tubers free for the operation of the fork G. At the same time the colter L is adjusted so as to scrape the top of the ridge, and taking off the vines and weeds deposits them in the trench on either side. The fork G follows the cutting-blade, rapidly revolving all the while, and pulverizing the earth throws out the tubers to one side, leaving the earth. The conical shape of the fork and the curved ends of the tines prevent any of the potatoes, or any clods of earth, roots, or vines from collecting upon the fork, as is the trouble with revolving forks or disks with straight arms, as heretofore constructed.

I make no claim for the device of a revolving disk or fork following the plow or cutting-blade, as that has heretofore been used.

What I do claim as my invention is—

1. In a potato digger following the plow or cutting-blade, a fork, revolving horizontally, depending from a vertical shaft, which is actuated by gear connected with the driving-wheels, the prongs of the fork being arranged collectively in form of a cone or segment of sphere, and with the lower extremity of each prong curved backward, substantially as shown and described.

2. A potato-digger consisting of a flat cutting-blade, D, preceded by a colter, L, and followed by the revolving fork G, the prongs of which are arranged collectively in form of a cone or segment of sphere, with the lower end of each prong curved backward, the fork depending from the vertical shaft H and revolving horizontally, being actuated by gear connected with the driving-wheels, substantially as shown and described, and for the purposes herein set forth.

GEORGE C. BARTLETT.

Witnesses:
EDWARD SMITH,
J. J. HOLDEN.